(12) United States Patent
Yoshida

(10) Patent No.: US 11,276,326 B2
(45) Date of Patent: Mar. 15, 2022

(54) SYSTEM, INFORMATION PROCESSING DEVICE, INFORMATION PROCESSING METHOD, PROGRAM, AND RECORDING MEDIUM

(71) Applicant: NS SOLUTIONS CORPORATION, Tokyo (JP)

(72) Inventor: Eiichi Yoshida, Tokyo (JP)

(73) Assignee: NS SOLUTIONS CORPORATION, Tokyo (JP)

( * ) Notice: Subject to any disclaimer, the term of this patent is extended or adjusted under 35 U.S.C. 154(b) by 0 days.

(21) Appl. No.: 16/334,327

(22) PCT Filed: Dec. 1, 2017

(86) PCT No.: PCT/JP2017/043272
§ 371 (c)(1),
(2) Date: Mar. 18, 2019

(87) PCT Pub. No.: WO2018/105514
PCT Pub. Date: Jun. 14, 2018

(65) Prior Publication Data
US 2019/0206277 A1  Jul. 4, 2019

(30) Foreign Application Priority Data
Dec. 7, 2016  (JP) .............................. JP2016-237655

(51) Int. Cl.
*G09B 19/00* (2006.01)
*G09B 5/06* (2006.01)
(Continued)

(52) U.S. Cl.
CPC ........... *G09B 19/00* (2013.01); *B65G 1/1371* (2013.01); *B65G 1/1373* (2013.01);
(Continued)

(58) Field of Classification Search
CPC ...................................................... G09B 19/00
See application file for complete search history.

(56) References Cited

U.S. PATENT DOCUMENTS 5,607,187 A * 3/1997 Salive .................. G09F 3/0297
235/375
8,423,431 B1  4/2013 Rouaix et al.
(Continued)

FOREIGN PATENT DOCUMENTS

JP   08-119415 A   5/1996
JP   2002-211713 A  7/2002
(Continued)

OTHER PUBLICATIONS

International Search Report of related PCT Application No. PCT/JP2017/043272 dated Feb. 13, 2018.
(Continued)

*Primary Examiner* — James S. McClellan
(74) *Attorney, Agent, or Firm* — Arent Fox LLP

(57) ABSTRACT

The present invention includes a determiner configured to determine whether to photograph a packing style image of an article as a work target in a first warehouse work or not, as an image used in a second warehouse work performed after the first warehouse work.

21 Claims, 14 Drawing Sheets

(51) Int. Cl.
*H04N 5/232* (2006.01)
*B65G 1/137* (2006.01)
*G06Q 10/06* (2012.01)
*G06Q 10/08* (2012.01)

(52) U.S. Cl.
CPC ..... *G06Q 10/06398* (2013.01); *G06Q 10/087* (2013.01); *G09B 5/06* (2013.01); *H04N 5/23222* (2013.01); *B65G 1/137* (2013.01); *B65G 2203/041* (2013.01)

(56) References Cited

U.S. PATENT DOCUMENTS

| | | | | |
|---|---|---|---|---|
| 2004/0149823 | A1* | 8/2004 | Aptekar | G06Q 10/08 235/385 |
| 2005/0128212 | A1* | 6/2005 | Edecker | G06T 15/04 345/582 |
| 2014/0003727 | A1* | 1/2014 | Lortz | G06F 16/583 382/218 |
| 2015/0192774 | A1* | 7/2015 | Watanabe | G06Q 10/087 345/8 |
| 2016/0101936 | A1* | 4/2016 | Chamberlin | G01B 11/2522 700/214 |
| 2017/0069135 | A1* | 3/2017 | Komaki | G06K 9/00536 |
| 2018/0201444 | A1* | 7/2018 | Welty | G06Q 10/08 |
| 2020/0074962 | A1* | 3/2020 | Norieda | G06T 7/70 |

FOREIGN PATENT DOCUMENTS

| | | |
|---|---|---|
| JP | 2006-306505 A | 11/2006 |
| JP | 2012-240826 A | 12/2012 |
| JP | 2015-124023 A | 7/2015 |

OTHER PUBLICATIONS

International Preliminary Report on Patentability issued in related Application No. PCT/JP2017/043272 dated Jun. 20, 2019.
Chinese Office Action issued in corresponding Chinese Patent Applicaton No. 201780058366.6 dated Aug. 29, 2019.
Chinese Office Action issued in by the Chinese Patent Office in corresponding Chinese Patent Application No. 201780058366.6, dated Dec. 23, 2019.
Dingyi, D., "China Logistics and Purchasing Informatization Outstanding Cases 2009", published by Beijing China Materials Press, pp. 100-102 introduce LVTR image recognition technology, (Aug. 2009).

* cited by examiner

USE STATE

STATE LOADED IN SHELF IN WAREHOUSE
(PACKING STYLE)

FIG.7

PLEASE PICK FOLLOWING COMMODITY!

LOCATION : 100-100
COMMODITY CODE : 123456789
COMMODITY NAME : TABLE (CIRCULAR SHAPE)
QUANTITY : 1 PIECE

FIG.8

PLEASE TAKE COMMODITY IMAGE AS PICKING TARGET!

SYSTEM, INFORMATION PROCESSING DEVICE, INFORMATION PROCESSING METHOD, PROGRAM, AND RECORDING MEDIUM

CROSS-REFERENCE TO RELATED APPLICATIONS

This application is a National Stage Entry of International Patent Application No, PCT/JP2017/043272, filed Dec. 1, 2017, which claims priority to Japanese Patent Application No. 2016-237655, filed Dec. 7, 2016. The disclosures of the priority applications are incorporated in their entirety herein by reference.

TECHNICAL FIELD

The present invention relates to a system, an information processing device, an information processing method, a program, and a recording medium.

BACKGROUND ART

There is a picking information processing system using an information processing device such as smart glasses (Patent Literature 1).

CITATION LIST

Patent Literature

Patent Literature 1: Japanese Laid-open Patent Publication No. 2006-306505

SUMMARY OF INVENTION

Technical Problem

In a picking information processing system using smart glasses or the like, an image (for example, an image used for advertising and the like) of a use state of an article as a picking target may be presented to a user who performs picking with wearing the smart glasses or the like. However, there is a case where a shape (a packing style) in a state where this article has been actually stored in a warehouse or the like is different from a shape in the use state of this article. Therefore, there is a case where, even if the image in the use state of this article is presented to the user in the picking of this article, the user cannot know the shape of the article he/she will pick to become perplexed, thus rather increasing a load.

Solution to Problem

Therefore, a system of the present invention includes a determiner configured to determine whether to photograph a packing style image of an article as a work target in a first warehouse work or not, as an image used in a second warehouse work performed after the first warehouse work.

Advantageous Effects of Invention

The present invention can determine whether it is necessary to photograph the packing style image of the article for a subsequent worker when a worker performs a warehouse work or not.

BRIEF DESCRIPTION OF DRAWINGS

FIG. 7 is a diagram illustrating an exemplary picking instruction screen.

FIG. 8 is a diagram illustrating an exemplary photographing instruction screen.

DESCRIPTION OF EMBODIMENTS

The following describes an embodiment of the present invention based on the drawings.

(System Configuration)

Figure 1:
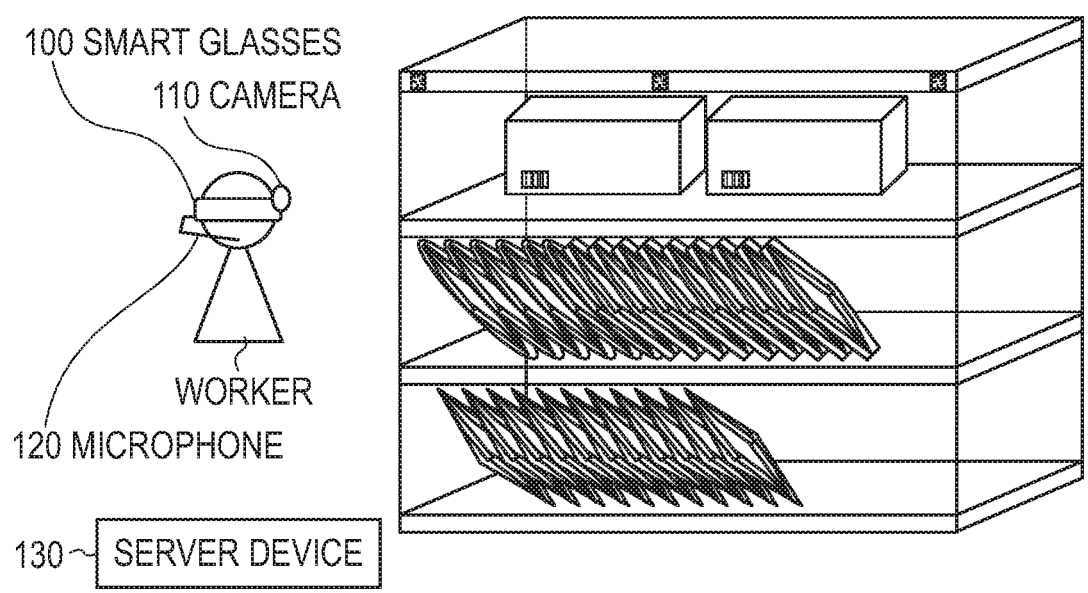
FIG. 1 is a diagram illustrating an exemplary system configuration of an information processing system.

FIG. 1 is a diagram illustrating an exemplary system configuration of an information processing system.

The information processing system, which is a system that supports a warehouse work of a user, includes a single pair of or plural pairs of smart glasses 100 and a server device 130. The warehouse work is a work in a warehouse such as a picking work of an article, a warehousing work of the article, and an organizing work caused by rearrangement of the article. The warehouse is a facility used for storage of the article. The storage of the article includes, for example, a temporal storage of the article such as a storage of a commodity from when an order is accepted and until when the commodity is sent, a temporal storage of a processed product of a product produced in a plant or the like, and a long-term storage of the article such as a stock or a reserve of a resource. The smart glasses 100 are coupled to the server device 130 via a network communicably by air.

The smart glasses 100, which are a glasses-type information processing device worn by the user who actually picks the article, are coupled to a camera 110 and a microphone 120.

The smart glasses 100, the camera 110, and the microphone 120 may be configured from one device or may be configured from different devices communicatively coupled by wire or by air.

The server device 130 is an information processing device that gives an instruction for picking to the smart glasses 100. The server device 130 is configured from, for example, a personal computer (PC), a tablet device, and a server device.

The following describes a configuration where a CPU 10 of the smart glasses 100 executes information processing including various determinations. However, the gist or the technical scope of the present invention includes a configuration where the smart glasses 100 function as only a display and the information processing including the various determinations is executed in a server device communicative with the smart glasses 100.

Outline of Process in the Embodiment

Figure 2A:
FIG. 2A is a diagram describing an exemplary shape in a use state of a table.
Figure 2B:
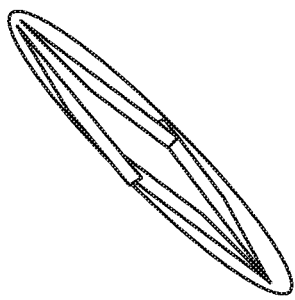
FIG. 2B is a diagram describing an exemplary packing style of the table.

FIG. 2A and FIG. 2B are diagrams describing an exemplary change in a shape of the article. For example, the picking target article is assumed to be a folding table. This table has a shape where legs are expanded as illustrated in FIG. 2A in use and has a shape where the legs are folded as illustrated in FIG. 2B when the table is stored in the warehouse. An image of the table having the shape in use can be easily obtained by diverting an image used for advertising and the like in a website. However, when the image illustrated in FIG. 2A is presented to the user who is going to actually pick this table, the following situation occurs. The user recognizes the article to be picked as the article having the shape illustrated in FIG. 2A to start searching the article having the identical shape in a shelf. However, the table stored in the shelf has the shape illustrated in FIG. 2B. Thus, it is difficult for the user to look the presented image to find the table as the picking target in the shelf.

Therefore, the information processing system preferably presents the image of the shape of the article in an actually stored state as illustrated in FIG. 2B to the user. In the following, the shape of the article in the actually stored state is assumed to be a packing style of the article. The information processing system need to obtain an image of the packing style of the article in order to present the packing style image of the article. However, photographing the packing style images of all the articles in warehousing is considerably cumbersome to make a load of a photographer excessive.

Therefore, the information processing system in this embodiment executes the following process. That is, when the user who is wearing the smart glasses 100 actually performs the picking, the information processing system determines whether the packing style image of the picking target article has been registered in the server device 130 or not. Then, when the packing style image of the article has not been registered, the information processing system displays a screen that instructs to photograph the packing style image of the picking target article on the smart glasses 100 worn by the user during the actual picking. The user, who firstly picks the article whose packing style image has not been registered in the server device 130, photographs the packing style image of this article to register the photographed image in the server device 130. The information processing system will be able to present the packing style image of this article to a user who picks the identical article later.

Thus, the information processing system causes the user, who picks the article whose packing style image has not been registered, to photograph the packing style of this article to obtain the packing style image of this article. Thus, the information processing system gets to be able to present the packing style image of this article to a user who picks the identical article thereafter.

(Hardware Configuration)

Figure 3:
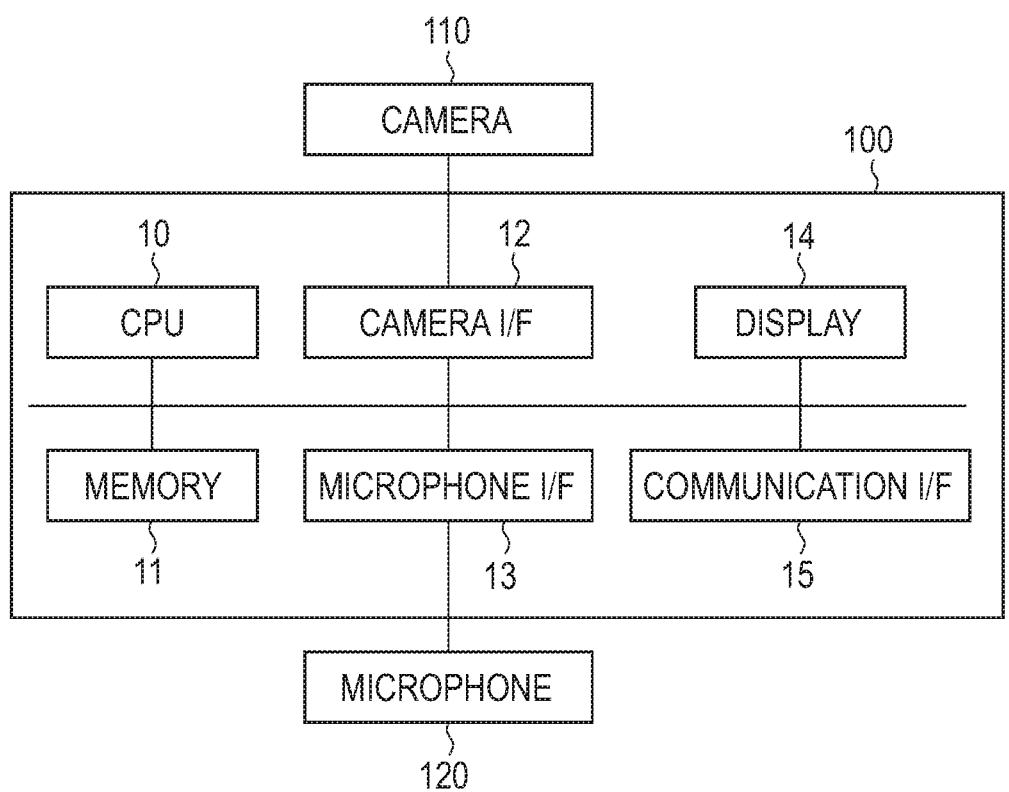
FIG. 3 is a diagram illustrating an exemplary hardware configuration and the like of smart glasses.

FIG. 3 is a diagram illustrating an exemplary hardware configuration and the like of the smart glasses 100. The smart glasses 100 include a processor such as the CPU 10, a memory 11, a camera I/F 12, a microphone I/F 13, a display 14, and a communication I/F 15. The respective configurations are coupled via a bus or the like. However, a part of or all of the respective configurations may be configured from different devices communicatively coupled by wire or by air.

The CPU 10 controls the whole smart glasses 100. The CPU 10 executes a process based on a program stored in the memory 11 to achieve a function of the smart glasses 100, a process of the smart glasses 100 in processes in sequence diagrams in FIG. 6 and FIG. 10, which are described below, a process in a flowchart in FIG. 12, and the like. The memory 11 stores the program and data and the like used when the CPU 10 executes the process based on the program. The memory 11 is an exemplary recording medium. The program may be, for example, stored in a non-temporarily recording medium to be read into the memory 11 via an input/output I/F. The camera I/F 12 is an interface to couple the smart glasses 100 to the camera 110. The microphone I/F 13 is an interface to couple the smart glasses 100 to the microphone 120. The display 14 is a display unit of the smart glasses 100. The display 14 is configured from a display and the like for realizing Augmented Reality (AR). The communication I/F 15 is an interface to communicate with another device, for example, the server device by wire or by air.

The camera 110 photographs an object such as a two-dimensional code, a barcode, and color bits attached to the article based on a request from the smart glasses 100. The microphone 120 inputs audio of the worker as voice data to the smart glasses 100 and outputs audio corresponding to the request from the smart glasses 100.

Figure 4:
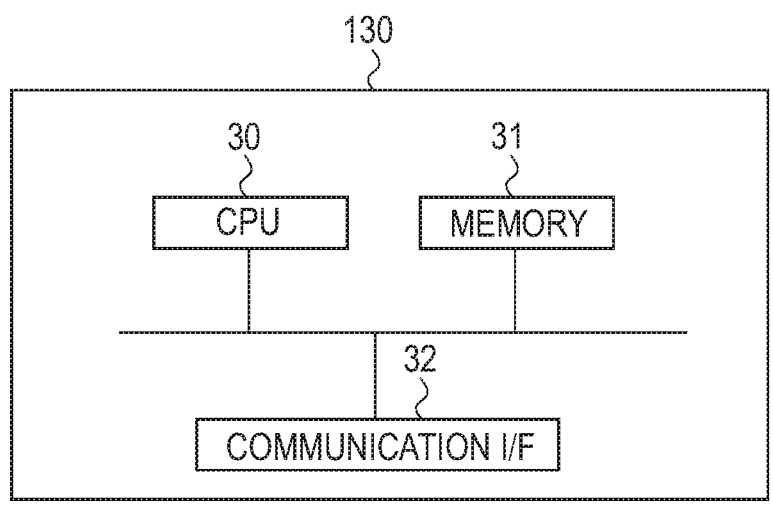
FIG. 4 is a diagram illustrating an exemplary hardware configuration of a server device.

FIG. 4 is a diagram illustrating an exemplary hardware configuration of the server device 130. The server device 130 includes a processor such as a CPU 30, a memory 31, and a communication I/F 32. The respective configurations are coupled via the bus or the like.

The CPU 30 controls the whole server device 130. The CPU 30 executes a process based on a program stored in the memory 31 to achieve a function of the server device 130, a process of the server device 130 in the processes in the sequence diagrams in FIG. 6 and FIG. 10, which are described below, and the like. The memory 31 is a storage unit of the server device 130. The memory 31 stores the program and data and the like used when the CPU 30 executes the process based on the program. The memory 31 is an exemplary recording medium. The program may be, for example, stored in a non-temporarily recording medium to be read into the memory 31 via an input/output I/F. The communication I/F 32 is an interface to communicate with another device, for example, the smart glasses 100 by wire or by air.

(Situation in Picking)

Figure 5:
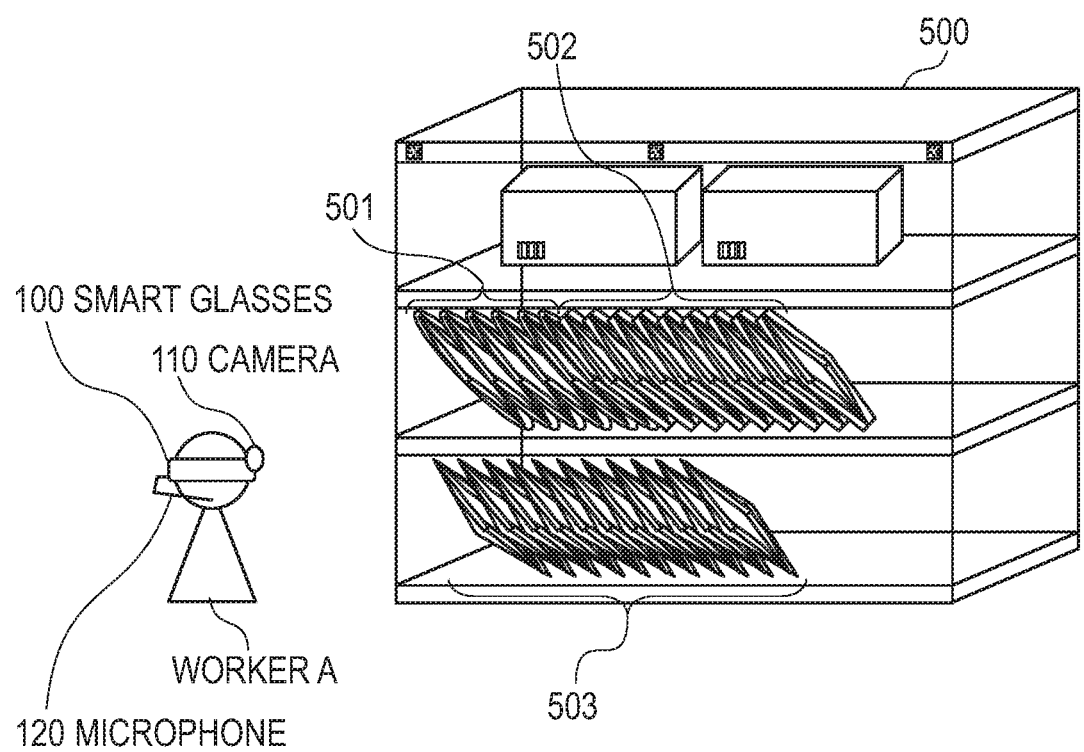
FIG. 5 is a diagram illustrating an exemplary situation in picking.

FIG. 5 is a diagram illustrating an exemplary situation in the picking.

The situation in FIG. 5 is a situation where a worker A is going to pick a table (circular shape) stored in a shelf 500. The shelf 500 stores a table group 501 of circular folding tables, a table group 502 of hexagonal folding tables, a table group 503 of rhomboidal folding tables, and the like. The worker A is an exemplary first worker.

The following describes a process of the information processing system in this embodiment in the situation illustrated in FIG. 5.

(Obtaining Process of Packing Style Image of Article)

Figure 6:
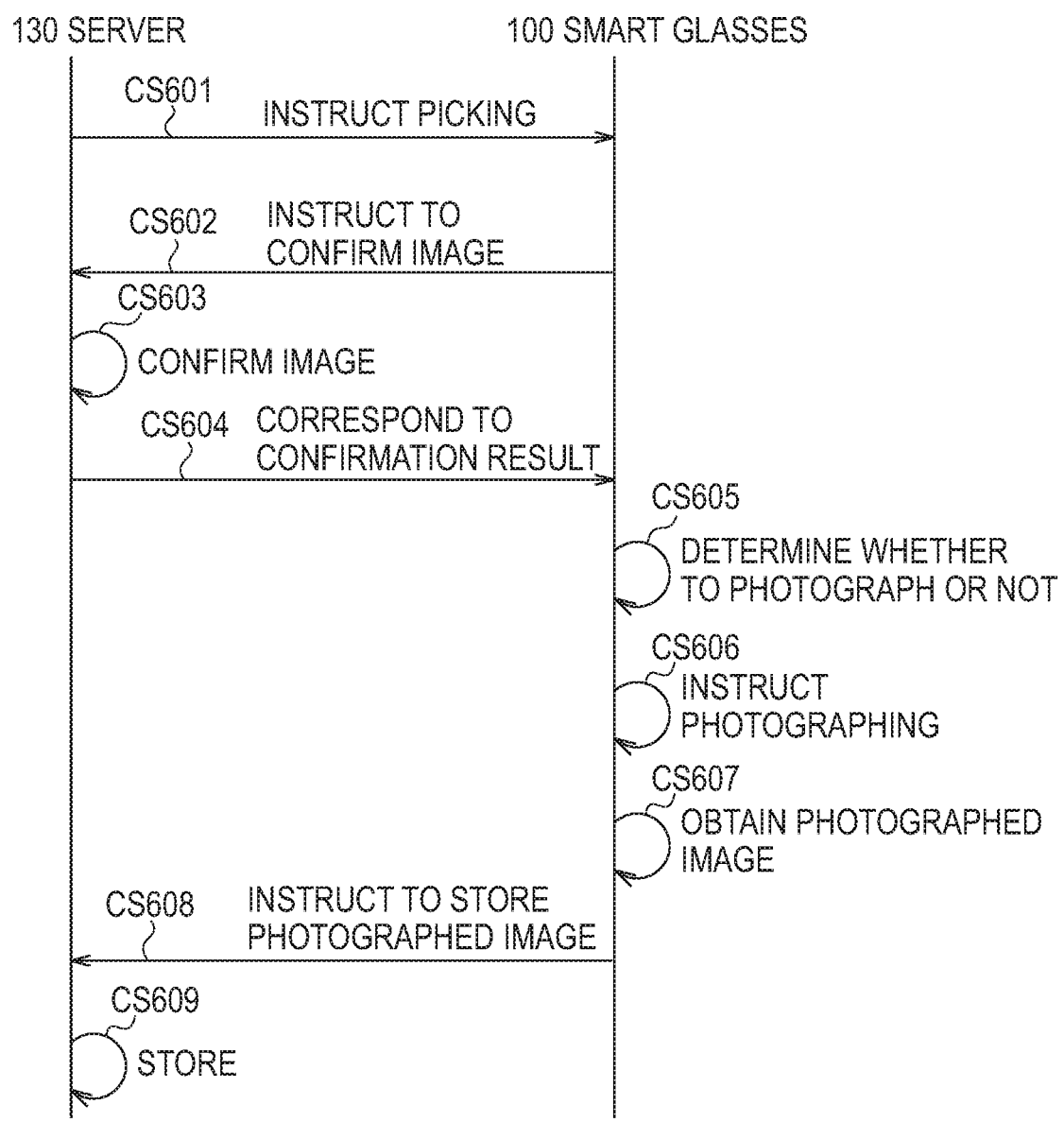
FIG. 6 is a sequence diagram illustrating an exemplary process of the information processing system.

FIG. 6 is the sequence diagram illustrating an exemplary process of the information processing system. An obtaining process of the packing style image of the article will be described using FIG. 6.

In CS601, the CPU 30 transmits a picking instruction of the table (circular shape) as the picking target article to the smart glasses 100. The CPU 30 puts position information of the shelf in which the table as the picking target has been stored, an article code of the table as the picking target, information on a name, information on the number of the tables to be picked, and the like in the picking instruction to be transmitted.

The CPU 10, after receiving the picking instruction, displays a picking instruction screen, which instructs the picking, with being superimposed on an actual scene, on the display 14, for example, based on the information included in the received picking instruction.

FIG. 7 illustrates an exemplary picking instruction screen displayed on the display 14 when the CPU 10 has received the picking instruction. The picking instruction screen in FIG. 7 includes display of a message that instructs the picking, a position (location) of the shelf where the picking target article is stored, the article code of the picking target article, an article name of the picking target article, and a quantity to be picked. The worker A who wears the smart glasses 100 can visually perceive this screen with being superimposed on the actual scenery to know where, what, and how many is to be picked up by oneself.

In CS602, the CPU 10 transmits a confirmation instruction whether the packing style image of the picking target article corresponding to the picking instruction transmitted in CS601 has been registered or not to the server device 130.

In CS603, corresponding to the confirmation instruction transmitted in CS602, the CPU 30 confirms whether the packing style image of the article (the table (circular shape)) having a type identical to that of the picking target article corresponding to the picking instruction transmitted in CS601 has been stored in the memory 31 or not. In FIG. 6, it is assumed that the packing style image of the article having the type identical to that of the picking target article corresponding to the picking instruction transmitted in CS601 has not been stored in the memory 31.

In CS604, the CPU 30 transmits a result of the confirmation process in CS603 to the smart glasses 100. The CPU 30 transmits information indicating the registration has not been done as the result of the confirmation process in S603 since the packing style image of the article having the type identical to that of the picking target article corresponding to the picking instruction transmitted in CS601 has not been stored in the memory 31.

In CS605, the CPU 10 determines whether to photograph the packing style image of the picking target article corresponding to the picking instruction transmitted in CS601 or not, based on the information transmitted in CS604. The CPU 10 determines to photograph the packing style image of the picking target article in order to obtain the packing style image of the picking target article since the information transmitted in CS604 is information indicating that the packing style image of the picking target article has not been registered.

In CS606, the CPU 10 displays a photographing instruction screen that instructs the photographing of the packing style image of the picking target article corresponding to the picking instruction transmitted in CS601 on the display 14, thus instructing the worker A to photograph the packing style of the picking target article. The CPU 10 displays the photographing instruction screen on the display 14 with being superimposed on the actual scene. FIG. 8 illustrates an exemplary photographing instruction screen displayed in CS606. The photographing instruction screen includes, for example, a message that instructs the photographing of the packing style of the picking target article.

Figure 9:
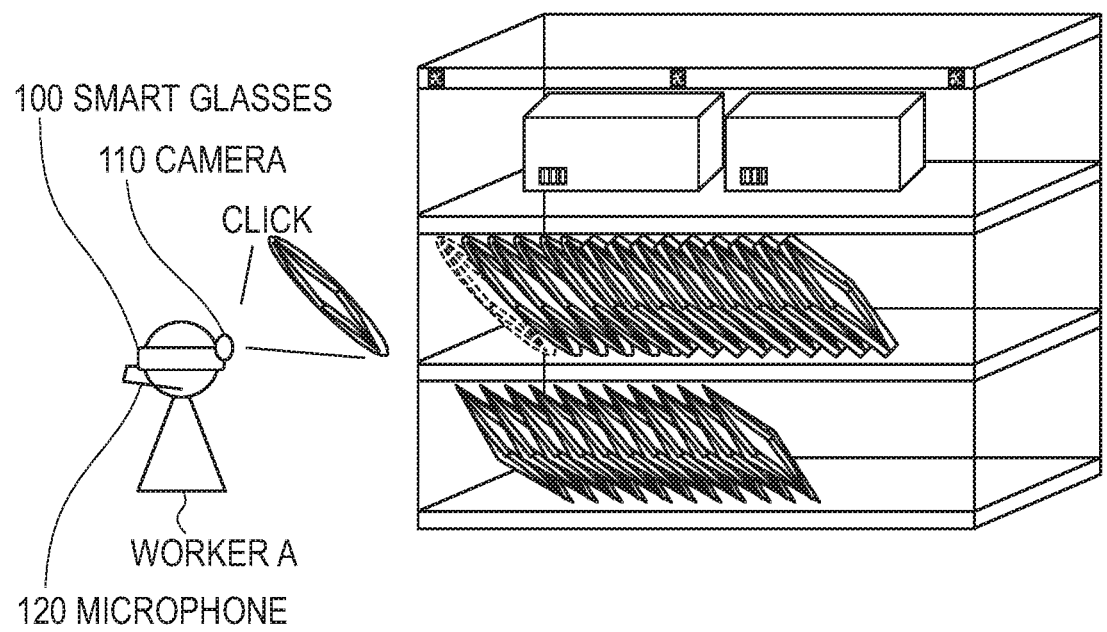
FIG. 9 is a diagram illustrating an exemplary situation in the photographing.

The worker A can visually perceive the photographing instruction screen displayed on the display 14 to know that he/she is instructed to photograph the packing style image of the picking target article. The worker A photographs the packing style image of the picking target article, for example, by operating the camera 110. FIG. 9 is a diagram illustrating an exemplary situation where the worker A extracts one picking target article from the shelf to photograph it using the camera 110. The CPU 10 instructs the camera 110 to perform the photographing, for example, corresponding to a photographing instruction received with audio via the microphone 120. The CPU 10 may instruct the camera 110 to perform the photographing, for example, corresponding to a photographing instruction received based on the operation of the user via an operating unit of the smart glasses.

The CPU 30 may put the information indicating that the image has not been registered in the picking instruction, and the CPU 10 may determine to photograph the packing style image based on this information.

In CS607, the CPU 10 obtains the packing style image of the picking target article photographed using the camera 110 by the user, corresponding to the instruction of the photographing in CS606. The CPU 10 obtains, for example, the image photographed with the camera 110 from the camera 110.

In CS608, the CPU 10 transmits a registration instruction of the image obtained in CS607 to the server device 130. The CPU 10 puts the information on the image obtained in CS607 in the registration instruction to be transmitted.

In CS609, the CPU 30 stores the information on the image included in the transmitted registration instruction, with being associated with the article code of the picking target article corresponding to the instruction transmitted in CS601, in the memory 31 corresponding to the registration instruction transmitted in CS608. With this process, the CPU 30 registers the packing style image of the picking target article.

With the above-described process, the information processing system can obtain the packing style image of the article corresponding to the picking instruction transmitted in CS601. This enables the information processing system to, after this process, present the packing style image of the article to the user who picks the identical article.

(Presentation Process of Packing Style Image of Article)

Figure 10:
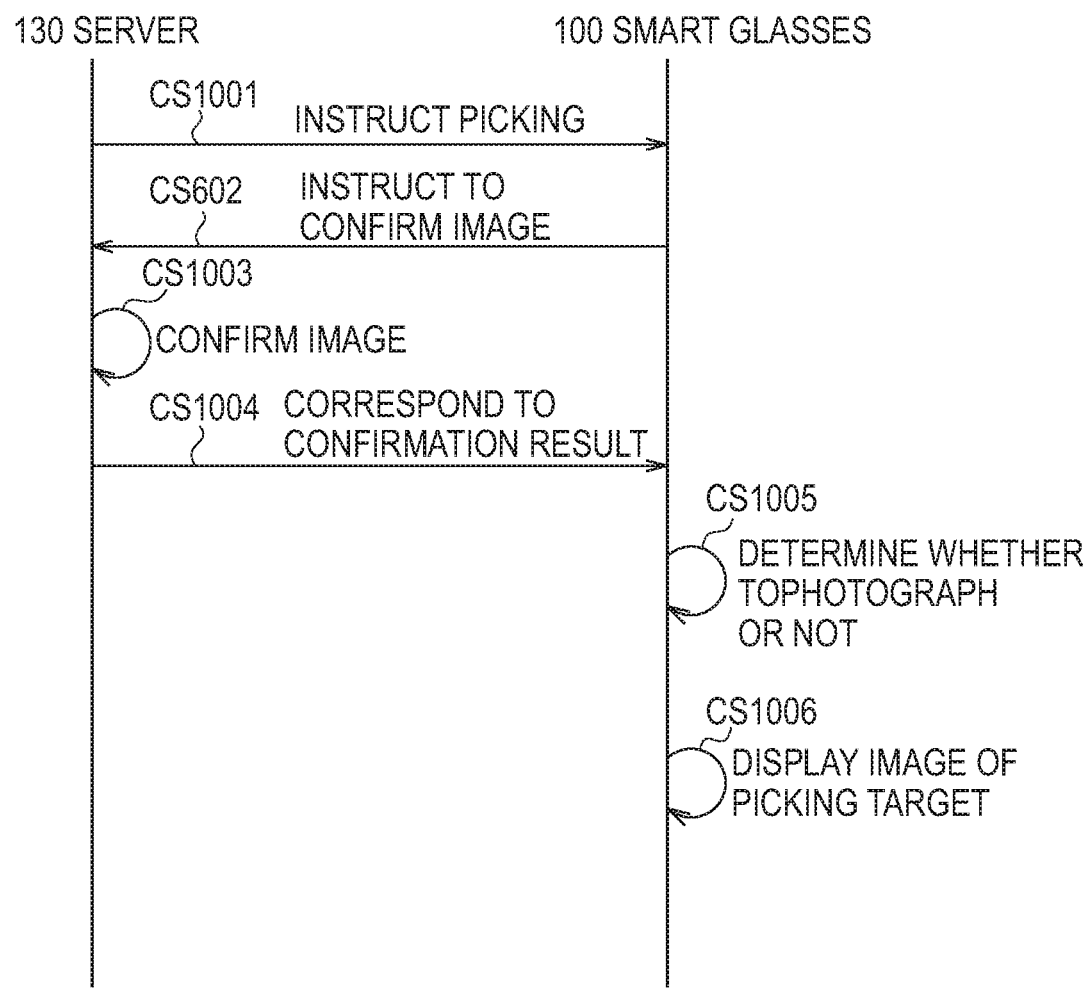
FIG. 10 is a sequence diagram illustrating an exemplary process of the information processing system.

FIG. 10 is the sequence diagram illustrating an exemplary process of the information processing system. Taking a case where, after the process in FIG. 6, the picking instruction of an article identical to the article corresponding to the picking instruction in S601 is given to a worker B as an example, a description will be given of a presentation process of the packing style image of the article using FIG. 10. In this embodiment, the information processing system is assumed to include plural pairs of smart glasses 100. The smart glasses 100 worn by the worker B are assumed to be different from the smart glasses 100 worn by the worker A in FIG. 6, but may be the identical ones. This embodiment assumes that, after the process in FIG. 6, the picking instruction of the article identical to the article corresponding to the picking instruction in S601 is given to the worker B different from the worker A, but the picking instruction may be given to the worker A. The worker B is an exemplary second worker who performs the picking work after the worker A. The picking work performed by the worker A in FIG. 6 is an exemplary first warehouse work. The picking work performed by the worker B in FIG. 10 is an exemplary second warehouse work as a warehouse work after the first warehouse work.

In CS1001, the CPU 30 transmits the picking instruction of the table (circular shape) as the picking target to the smart glasses 100 worn by the worker B. The CPU 30 puts the position information of the shelf in which the table as the picking target has been stored, the article code of the table as the picking target, the information on the name, and the information on the number of the tables to be picked in the picking instruction to be transmitted.

The CPU 10, after receiving the picking instruction, displays the picking instruction screen that instructs the picking as in FIG. 7 on the display 14, for example, based on the information included in the received picking instruction.

In CS1002, the CPU 10 transmits the confirmation instruction whether the packing style image of the picking target article corresponding to the picking instruction transmitted in CS1001 has been registered or not to the server device 130.

In CS1003, the CPU 30, corresponding to the confirmation instruction transmitted in CS1002, confirms whether the packing style image of the picking target article corresponding to the picking instruction transmitted in CS1001 has been registered in the memory 31 or not. In FIG. 10, the packing style image of the picking target article has been registered since the packing style image of the article (the table (circular shape)) having the type identical to that of the picking target article corresponding to the picking instruction transmitted in CS1001 has been stored in the memory 31 with the process in FIG. 6.

In CS1004, the CPU 30 transmits a result of the confirmation process in CS1003 to the smart glasses 100 worn by the worker B. The CPU 30 transmits information indicating that the registration has been done as result information of the confirmation process in S1003 since the packing style image of the picking target article corresponding to the picking instruction transmitted in CS1001 has been registered in the memory 31. The CPU 30 puts the information on the packing style image of the article having the type identical to that of the picking target article corresponding to the picking instruction transmitted in CS1001 stored in the memory 31, in the result information to be transmitted.

In CS1005, the CPU 10 determines whether to photograph the packing style image of the picking target article corresponding to the picking instruction transmitted in CS1001 or not based on the result information transmitted in CS1004. The CPU 10 determines not to photograph the packing style image of the picking target article as the packing style image of the picking target article has already been registered, since the result information transmitted in CS1004 is the information indicating that the packing style image of the article having the type identical to that of the picking target article has been registered.

The CPU 30 may put the information indicating that the image has already been registered, in the picking instruction, and the CPU 10 may determine not to photograph the packing style image based on this information.

Figure 11:
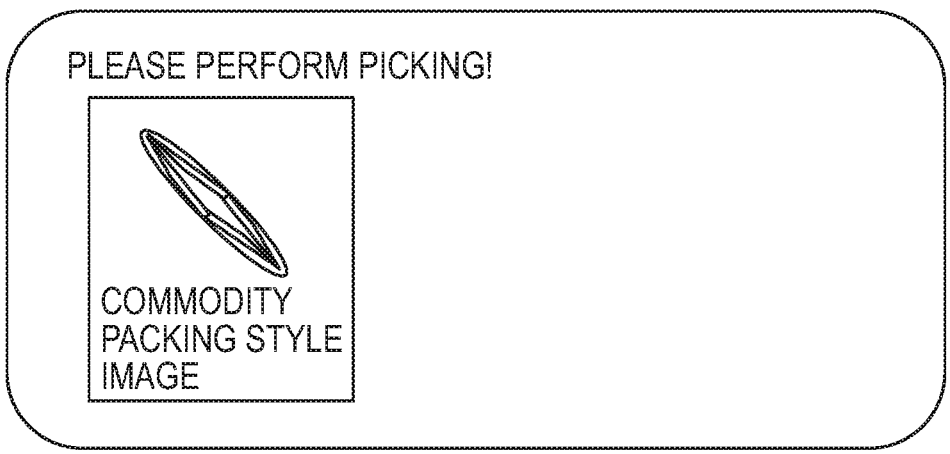
FIG. 11 is a diagram illustrating an exemplary presentation screen.

In CS1006, the CPU 10 presents the packing style image of the picking target article corresponding to the picking instruction transmitted in CS1001 to the worker B. The CPU 10 obtains the packing style image of the picking target article, for example, from the result information transmitted in CS1004. Then, the CPU 10 displays the presentation screen to present the obtained image on the display 14 to present the packing style image of the picking target article to the worker B. The CPU 10 displays the presentation screen on the display 14 with being superimposed on the actual scene. FIG. 11 illustrates an exemplary presentation screen. The presentation screen includes the packing style image of the picking target article. The worker B can visually perceive the presentation screen to know in what sort of shape the picking target article has been stored.

Moreover, the worker B can confirm the picking target with the image not the article name and the article code. Thus, even if the article is confusable in appearance, such as the table group 501 of the circular folding tables, the table group 502 of the hexagonal folding tables, and the table group 503 of the rhomboidal folding tables, and the article possibly makes the worker confused in the picking, the worker B can surely pick up the target article. The image is not limited to a still image and may be a moving image.

Thus, after the process in FIG. 6, the information processing system can support the picking work by presenting the packing style image of the picking target article to all the users who pick the article identical to the picking target article corresponding to the instruction in S601.

(Detail of Process of Smart Glasses)

Figure 12:
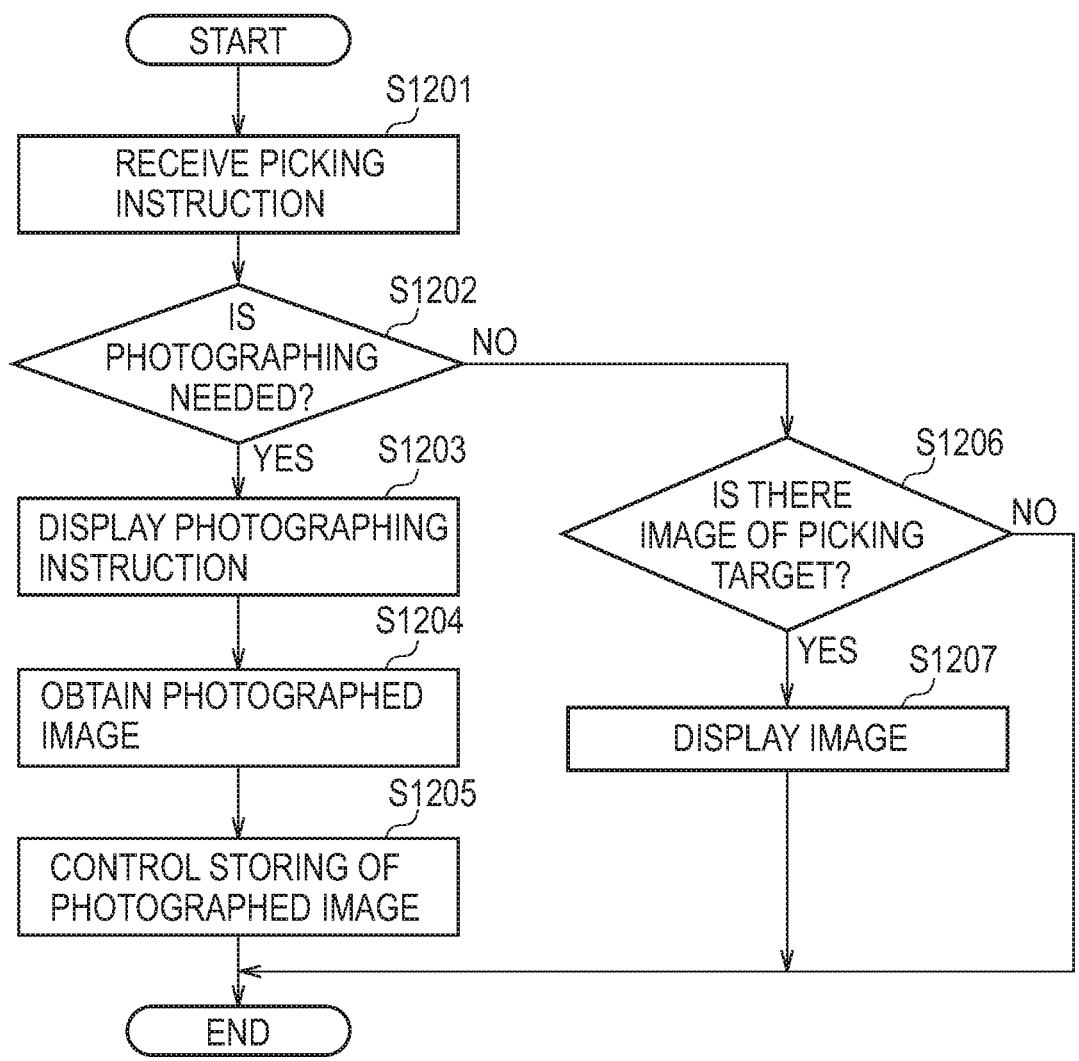
FIG. 12 is a flowchart illustrating an exemplary process of the smart glasses.

FIG. 12 is the flowchart illustrating an exemplary process of the smart glasses 100. A description will be given of the detail of the process of the smart glasses 100 used in the processes in the sequence diagrams in FIGS. 6 and 10 using FIG. 12.

In S1201, the CPU 10 receives the picking instruction from the server device 130.

In S1202, the CPU 10 determines whether to photograph the packing style image of the picking target article corresponding to the picking instruction received in S1201 or not. In this embodiment, the CPU 10 determines whether to photograph the packing style image of the picking target article or not, based on whether the packing style image of the picking target article has been registered in the server device 130 or not. The CPU 10, for example, transmits the confirmation instruction whether the packing style image of the picking target article has been registered or not to the server device 130. Then, the CPU 30, corresponding to the transmitted confirmation instruction, confirms whether the packing style image of the picking target article has been registered in the memory 31 or not to transmit the result information of the confirmation to the smart glasses 100. The CPU 10 determines whether to photograph the packing style image of the picking target article or not based on the transmitted result information.

When the packing style image of the picking target article has been registered in the server device 130, the CPU 10 determines to photograph the packing style image of the picking target article to proceed to the process in S1203. When the packing style image of the picking target article has not been registered in the server device 130, the CPU 10 determines not to photograph the packing style image of the picking target article to proceed to the process in S1206.

In S1203, the CPU 10 displays the photographing instruction screen that instructs the photographing of the packing style image of the picking target article corresponding to the picking instruction received in S1201 on the display 14 to instruct the user who is wearing the smart glasses 100 to perform the photographing.

In S1204, the CPU 10, corresponding to the photographing instruction in S1203, obtains the packing style image of the picking target article photographed using the camera 110 by the user. The CPU 10 obtains, for example, the packing style image of the picking target article photographed with the camera 110 from the camera 110.

In S1205, the CPU 10 transmits the registration instruction of the image obtained in S1204 to the server device. The CPU 10 puts the information on the image obtained in S1204 in the registration instruction to be transmitted. The CPU 30, after receiving the registration instruction from the smart glasses 100, stores the information on the image included in the received registration instruction in the memory 31 with being associated with the article code of the picking target article. This enables the information processing system to register the packing style image of the article whose packing style image has not been registered in the memory 31.

In S1206, the CPU 10 determines whether there is the packing style image of the picking target article corresponding to the picking instruction received in S1201 or not. For example, when the result information received in S1202 includes the information on the packing style image of the picking target article, the CPU 10 determines that there is the packing style image of the picking target article to proceed to the process in S1207. For example, when the result information received in S1202 does not include the information on the packing style image of the picking target article, the CPU 10 determines that there is not the packing style image of the picking target article to end the process in FIG. 12.

In S1207, the CPU 10 displays the image determined to exist in S1206 on the display 14 to present it to the user who wears the smart glasses 100. The CPU 10 displays, for example, the presentation screen including the image determined to exist in S1206 on the display 14. This enables the information processing system to support the picking work by presenting the packing style image of the picking target article to the user.

Effect

As described above, with the process in this embodiment, the information processing system can determine whether to photograph the packing style for the picking target article or not for a worker after the worker who is performing the picking. Then, the information processing system, when photographing the packing style, instructs the user to photograph the packing style of this article. This enables the information processing system to support the obtaining of the packing style image of the article. It is not necessary to photograph the packing style images of all the articles in the warehousing and prepare a worker specialized in the photographing of the packing style of the article. Thus, the information processing system can reduce the load to collect the packing style images.

The information processing system will store the packing style image in the memory 31 at a timing when the picking is actually performed. Therefore, the information processing system has not stored the packing style image in the memory 31 until the timing when the picking is actually performed. That is, the information processing system can save a storage area of the memory 31 compared with the case where the packing style images of all the articles are photographed for the articles in the warehousing.

The information processing system further obtains the image photographed by the user who is instructed to perform the photographing to store and register it in the memory 31. This enables the information processing system to present the packing style image of the article to the user who picks the identical article thereafter.

With the process in this embodiment, the user who performs the picking puts effort as the photographing of the packing style image of the picking target article during the picking work. This enables the information processing system to improve an efficiency in the picking work of another user. This enables the information processing system to achieve the efficiency in the whole picking work.

On some articles stored in the warehouse, a marker such as the two-dimensional code, the barcode, and a color code that indicates the information on the article cannot be stuck. In the picking work of such an article, the worker possibly cannot identify this article by scanning the marker, thus making it difficult to know the picking target article. In such a case, the information processing system can support the worker to know the picking target article by presenting the packing style image of the article to the worker. That is, the information processing system can achieve the efficiency especially in the picking work of such an article.

The information processing system in this embodiment determines whether to photograph the packing style image of the article as the work target in the first warehouse work or not, as the image used in the second warehouse work such as the picking work in FIG. 10 performed after the first warehouse work such as the picking work in FIG. 6.

The second warehouse work is performed after the first warehouse work according to the above-described configuration. The information processing system determines whether to photograph the packing style image of the article as the work target when the first warehouse work is performed or not.

For example, when a certain delivery worker (a picking worker) takes out a certain article from the shelf as the first warehouse work, the information processing system determines necessity and rationality in the article image photographing. Alternatively, when a certain warehousing worker puts a certain article in the shelf as the first warehouse work, the information processing system determines the necessity and the rationality in the article image photographing.

Based on a result of this determination, the information processing system, for example, instructs the worker (the delivery worker or the warehousing worker) in the first warehouse work to perform the photographing to cause the worker to photograph the packing style of the article.

Then, this photographed image is used to be presented as an AR image or the like in order to facilitate the picking work, for example, when the worker in the subsequent second warehouse work performs a delivery work as the second warehouse work.

This enables the information processing system to improve a work efficiency of another worker by putting effort as the photographing of the packing style image of the article during the warehouse work of a certain worker.

The information processing system, when determining to photograph the packing style image of the article, preferably instructs the worker in the first warehouse work to photograph the packing style image of the article.

This causes the worker in the first warehouse work to photograph the packing style of the article to enable the worker in the second warehouse work to use the photographed image.

The information processing system, when determining to photograph the packing style image of the article, preferably further includes a photographer that photographs the packing style image of the article when it becomes photographable.

This enables the information processing system to save the effort of the worker to photograph the packing style image of the article at a timing when the packing style image of the article is photographable, for example, when scanning the barcode.

The information processing system preferably further includes a presenter that presents the packing style image of the article photographed corresponding to the instruction to the worker who receives the instruction regarding the second warehouse work for the article having the type identical to that of the target article in the first warehouse work after the first warehouse work.

This enables the worker in the second warehouse work to perform the work by referring to the article image photographed by the worker in the first warehouse work, thus efficiently performing the warehouse work.

Both of the first warehouse work and the second warehouse work are not limited to the delivery work such as the picking and also include the work regarding the warehousing.

In the information processing system, it is preferable to determine whether to photograph the packing style image of the article or not based on whether the packing style image of the article having the type identical to that of the article as the target in the first warehouse work has been registered or not.

The above-described configuration includes not only the configuration to determine whether the packing style image has already been registered or not for the article having the identical article code but also the configuration to determine whether the packing style image has already been registered or not for a combination of the shelf with the article code, and to determine that the article is not an article having a different type to photograph the packing style of the article when the packing style image has not been registered.

Thus, for example, when the image of the identical article has not been photographed yet, it is determined to be necessary to photograph the article image, and the image of the article will be photographed. Thus, unnecessary photographing of the article image can be prevented. That is, the information processing system can reduce usage rates of the CPUs 10 and 30 in the process of the unnecessary photographing. The information processing system can save a network band in communication of data of the image photographed with the unnecessary photographing.

In a case of a configuration where articles are determined to have the identical type only when the articles have an identical article code and are in an identical location, as the packing style image of the article, for example, the image of a state where the article is placed in the shelf is photographed. This is especially effective, for example, in a case where the image indicating how the article is placed in the shelf is necessary.

The information processing system preferably determines whether to photograph the packing style image of the article or not based on an order content of an article having the type identical to that of the article.

The information processing system preferably determines whether to photograph the packing style image of the article or not based on whether there is an order of an article having the type identical to that of the target article in the first warehouse work as the order content or not.

Thus, for example, when there is a plan to deliver the identical articles with a predetermined number N or more thereafter (for example, in an identical day), it is determined to be rational to photograph the article image, and the image of the article will be photographed. Thus, the unnecessary photographing of the article image can be prevented. That is, the information processing system can reduce the usage rates of the CPUs 10 and 30 in the process of the unnecessary photographing. The information processing system can save the network band in the communication of the data of the image photographed with the unnecessary photographing.

The information processing system preferably determines whether to photograph the packing style image of the article or not based on a state of the target article in the first warehouse work.

Thus, for example, as the state of the article, when flag information indicating that the article is an article considered unsearchable with another means other than the image, such as a QR code (registered trademark) and color bits is set, or when flag information indicating that the article is in a specific location, article classification, or the like thus being a photographed exception target is not set, the system determines this article as a photographed target.

The information processing system preferably determines whether to photograph the packing style image of the article or not based on whether the article is in a state contained in a case or not as the state of the target article in the first warehouse work.

Thus, for example, since, for the article contained in a packing material such as a corrugated cardboard, even if the image of its state is presented to the worker, it is not effective information, the unnecessary photographing of the packing style can be prevented. That is, the information processing system can reduce the usage rates of the CPUs 10 and 30 in the process of the unnecessary photographing. The information processing system can save the network band in the communication of the data of the image photographed with the unnecessary photographing.

The information processing system, when determining to photograph the packing style image of the target article in the first warehouse work, displays information instructing the photographing of the packing style image of the article on the display unit.

Here, the photographing of the article is not limited to the photographing instruction of the image of, for example, an article single body (for example, a state picked up by the worker) and, for example, may be the photographing instruction about the image of a state where the article is placed in the shelf, and may be the photographing instruction of both, thus being not limited. Especially, for the image of the state where the article is placed in the shelf, a plurality of articles are captured in the image. Thus, it may be a configuration where, for example, an arrow is displayed in the photographing to display a message such as "please photograph the article with adjusting the article below this arrow," thus saving the photographed image with overlapping this arrow.

This can appropriately photograph the image used by the subsequent worker.

In the information processing system, it is preferable to accept an evaluation for the packing style image from the worker and to display the information instructing the photographing of the packing style image of the article on the display unit to instruct the first worker to photograph the packing style image of the article when this evaluation is an evaluation indicating unsuitableness as the packing style image of the article.

Thus, for example, when there are a given number or more of unsuitable evaluation responses, this packing style image can be deleted, and only effective packing style images can be held. Thus, the packing style image can be efficiently managed.

The server device 130 included in the information processing system is assumed to execute the process to determine whether to photograph the packing style image of the work target article in the first warehouse work or not as the image used in the second warehouse work performed after the first warehouse work. However, the smart glasses 100 may execute the similar process and it is not specifically limited.

Modification

The following describes a modification of this embodiment.

In this embodiment, the CPU 10 determines whether to photograph the packing style image of the picking target article or not based on whether the packing style image of the picking target article has been registered in the server device 130 or not. For example, there are cases where the article is contained in the case to cause the shape of the article to be not visually perceived from outside, the article has an outstanding size to facilitate the visual perception, and the article is stored in the shelf that can store only a few articles to facilitate the visual perception. In such cases, even if there is no image of the packing style, the packing style image is unnecessary, thus eliminating the need for the photographing of the packing style. Therefore, the CPU 10 may determine whether to photograph the packing style image of the picking target article or not based on the state of the picking target article in S1202 or the like.

For example, when the article has been packed in the case such as a corrugated cardboard box, the packing style of this article has a shape of the case and does not have a shape with which this article can be recognized. Therefore, even if the image of the state where the article has been packed in the case is presented, this does not support the user in the picking work.

Therefore, in the case of the state where the picking target article has been packed in the case, the CPU 10 may determine not to photograph the packing style image of the picking target article. In the case of a state where the picking target article is not packed in the case, the CPU 10 may determine to photograph the packing style image of the picking target article.

The CPU 10 can, for example, obtain the information indicating whether the picking target article is the article packed in the case or not from the server device 130 to know whether the picking target article has been packed in the case or not based on the obtained information.

However, when the article has been packed in the case, if the number of the articles in the case has reduced, the worker who performs the picking, an administrator in the warehouse, or the like may take the remaining articles out of the case to remove the case from the position such as the shelf in which the article has been stored. That is, without involvement from the server device 130, the state of the article in store may change. In such a case, the CPU 10 cannot obtain accurate information indicating whether the picking target article is the article packed in the case or not from the server device 130.

Therefore, it is assumed that the object such as the two-dimensional code, the barcode, or the color bits representing information indicating what is contained in the case has been stuck on this case for packing the article. In such a case, the CPU 10 can recognize the object stuck on the case, for example, via the camera 110 to know what is contained in this case and know whether the picking target article has been packed in the case or not. When the CPU 10 recognizes the object stuck on the case, for example, via the camera 110 to know that the picking target article is contained in this case, the CPU 10 determines not to photograph the packing style image of this article. When the worker who performs the picking, the administrator in the warehouse, or the like takes the remaining articles out of the case to remove the case from the position such as the shelf in which the article has been stored, the CPU 10 does not recognize the object stuck on the case via the camera 110. In this case, the CPU 10, for example, assumes not to recognize the object stuck on the case to determine to photograph the packing style image of this article. Therefore, the CPU 10 can determine to instruct the photographing of the packing style image for the article taken out of the case.

The object such as the two-dimensional code, the barcode, or the color bits indicating the information on the article has been also stuck on the picking target article. The user of the smart glasses 100 photographs the object stuck on the picked article using the camera 110. The CPU 10 recognizes the object stuck on the article photographed with the camera 110 to know what has been picked.

In such a case, the user of the smart glasses 100, when picking the article contained in the case, will first photograph the object stuck on the case with the camera 110 and next photograph the object stuck on the picked article. At this time, the CPU 10 will first recognize the object stuck on the case and then recognize the object stuck on the article. The user of the smart glasses 100, when picking the article that is not contained in the case, will directly photograph the object stuck on the picked article. At this time, the CPU 10 will directly recognize the object stuck on the article.

Therefore, the CPU 10, before recognizing the object stuck on the picking target article, may determine whether the picking target article has been contained in the case or not based on whether the object stuck on the case has been recognized or not. Then, the CPU 10 determines whether to photograph the packing style image of the article or not based on a state whether the picking target article has been contained in the case or not. The CPU 10, for example, when recognizing the object stuck on the case before recognizing the object stuck on the picking target article, determines that this article has been contained in the case to determine not to photograph the packing style image. The CPU 10, for example, when not recognizing the object stuck on the case before recognizing the object stuck on the picking target article, determines that this article is not contained in the case to determine to photograph the packing style image.

The above has described the process where the CPU 10 determines whether to photograph the packing style image of the picking target article or not based on the state whether the article has been packed in the case or not as the article state.

The CPU 10 may determine whether to photograph the packing style image of the picking target article or not based on the location of the article (for example, the position of the shelf in which the article has been stored) as the article state. For example, the CPU 10 may determine not to photograph (or determine to photograph) the packing style image of the article in a case of a state where the information indicating that the picking target article is out of the photographed target (or the information indicating that the picking target article is the photographed target) exists on the set location.

The CPU 10 may determine whether to photograph the packing style image of the picking target article or not based on the size of the article as the article state. For example, when the size of the picking target article is a set threshold or more, the CPU 10 may determine not to photograph (or determine to photograph) the packing style image of this article. For example, when the size of a region occupied by the picking target article detected in image processing or the like is a set threshold or more in the image photographed via the camera 110, the CPU 10 may determine not to photograph (or determine to photograph) the packing style image of this article.

As described above, the CPU 10 can determine whether to photograph the packing style image of the picking target article or not based on the state of the picking target article to reduce the load in the unnecessary photographing work corresponding to the state of the picking target article.

For example, also in a case where a certain user is instructed to pick the article whose packing style image has not been registered, for example, when there is no other order of the identical article and there is no plan of the picking in a subsequent predetermined period (for example, on the same day), it is not necessary to photograph the packing style image of this article. Therefore, the CPU 10 may determine whether to photograph the packing style image of the picking target article or not based on the order content of the picking target article in S1202.

The CPU 10, for example, requests the information indicating the order content of the picking target article from the server device 130 in S1202. The memory 31 has preliminarily stored the information indicating the order content of the picking target article. The information indicating the order content of the article is, for example, information indicating when and how many articles are to be picked. The CPU 30, after receiving the request of the information indicating the order content, transmits the information indicating the order content of the picking target article stored in the memory 31 to the smart glasses 100.

The CPU 10 determines whether to photograph the packing style image of the picking target article or not based on the order content of the picking target article indicated in the information received from the server device 130. For example, when the order content of the picking target article indicated in the information received from the server device 130 is information indicating that new picking will not be performed after the current picking, the CPU 10 determines not to photograph the packing style image of the picking target article. For example, when the order content of the picking target article indicated in the information received from the server device 130 is information indicating that new picking will be performed after the current picking, the CPU 10 determines to photograph the packing style image of the picking target article.

As described above, the CPU 10 can determine whether to photograph the packing style image of the picking target article or not based on the order content of the picking target article to reduce the load in the unnecessary photographing work corresponding to the order content.

For example, when the order content of the picking target article indicated in the information received from the server device 130 is information indicating that the picking will be performed only a certain number of times after the current picking, the CPU 10 may execute a process as follows. That is, when this number of times is a set threshold or more, the CPU 10 may determine to photograph the packing style image of the picking target article. When this number of times is less than the set threshold, the CPU 10 may determine not to photograph the packing style image of the picking target article. When the planed number of the picking of the article having the identical type is less than the set threshold after a certain picking work, the packing style image of the article will not be frequently used. Thus, there is a case where a merit commensurate with the load in the photographing work on the user cannot be obtained. When the merit commensurate with the load in the photographing work cannot be obtained with the above-described process, the CPU 10 does not instruct the photographing. Thus, the load in the photographing work can be reduced.

The above has described the process where the CPU 10 determines whether to photograph the packing style image of the picking target article or not based on any one of whether the packing style image has been registered in the server device 130 or not, the article state, and the order content of the article. However, the CPU 10 may determine whether to photograph the packing style image of the picking target article or not based on a plurality of conditions.

For example, the CPU 10 may determine whether to photograph the packing style image of the picking target article or not based on whether the packing style image has been registered in the server device 130 or not and the order content of the article. The CPU 10 first determines whether the packing style image has been registered in the server device 130 or not. Then, the CPU 10, when determining that the packing style image has been registered in the server device 130, determines not to photograph the packing style image of the picking target article. The CPU 10, when determining that the packing style image has not been registered in the server device 130, obtains the information indicating the order content of the picking target article from the server device 130. Then, when the order content indicated in the obtained information is the information indicating that new picking will be performed after the current picking, the CPU 10 determines to photograph the packing style image of the picking target article. When the order content indicated in the obtained information is the information indicating that new picking will not be performed after the current picking, the CPU 10 determines not to photograph the packing style image of the picking target article.

As described above, the CPU 10 can determine whether to photograph the packing style image of the picking target article or not based on the plurality of conditions to reduce the load in the unnecessary photographing work with higher accuracy.

As described above, the information processing system can determine whether to photograph the packing style image of the picking target article or not based on the conditions other than whether the packing style image has been registered or not to instruct the photographing of the packing style image only for the article having a high efficiency improvement effect. This enables the information processing system to eliminate the need for the photographing of the packing style image for all the articles to substantially reduce the load on the worker in collection of the packing style image of the article. The information processing system can reduce exchange of the unnecessary image between the smart glasses 100 and the server device 130 to save a communication band between the smart glasses 100 and the server device 130. The information processing system can eliminate the need to store the unnecessary image Lo save the storage area of the memory 31.

When the packing style image of the picking target article has been registered in the server device 130, the information processing system presents the packing style image of the picking target article to the user who performs the picking.

There is a case where this presented image is, for example, a blurred image, a darkish image, or an image where only a part of the article is captured and the whole is ungraspable.

When an inappropriate image is thus presented, the information processing system may execute the following process. That is, the CPU 10, after presenting the image, transmits evaluation information indicating that the image is inappropriate to the server device 130, based on the operation by the user via the operating unit of the smart glasses 100, the microphone 120, or the like. The CPU 30, after accepting the evaluation information indicating that the image is inappropriate, deletes the packing style image of the picking target article registered in the memory 31 to additionally transmit information indicating that the packing style image of the picking target article is photographed to the smart glasses 100. The CPU 10, after receiving the information indicating that the packing style image of the picking target article is photographed, displays the photographing instruction screen as illustrated in FIG. 8 on the display 14 to instruct the user to photograph the packing style image of the picking target article. Then, the CPU 10 transmits the image photographed in response to the instruction to the server device 130 to instruct to store the image in the memory 31.

With the above-described process, when the inappropriate image has been registered as the packing style image of the picking target article, the information processing system can support the obtaining of an appropriate image.

In this embodiment, the smart glasses 100 determines whether to photograph the packing style image of the picking target article or not. However, the server device 130 may determine whether to photograph the packing style image of the picking target article or not. In this case, the CPU 30, before transmitting the picking instruction to the smart glasses 100, determines whether to photograph the packing style image of the picking target article with a process similar to that in S1202 or the like or not. Then, the CPU 30 will transmit the information indicating whether to photograph the packing style image of the picking target article or not to the smart glasses 100 together with the picking instruction. That is, the CPU 30 transmits the information indicating that the packing style image of the picking target article is photographed to the smart glasses 100 to cause the smart glasses 100 to display the picking instruction screen on the display 14. Thus, the CPU 30 instructs the worker to perform the photographing.

Figure 13:
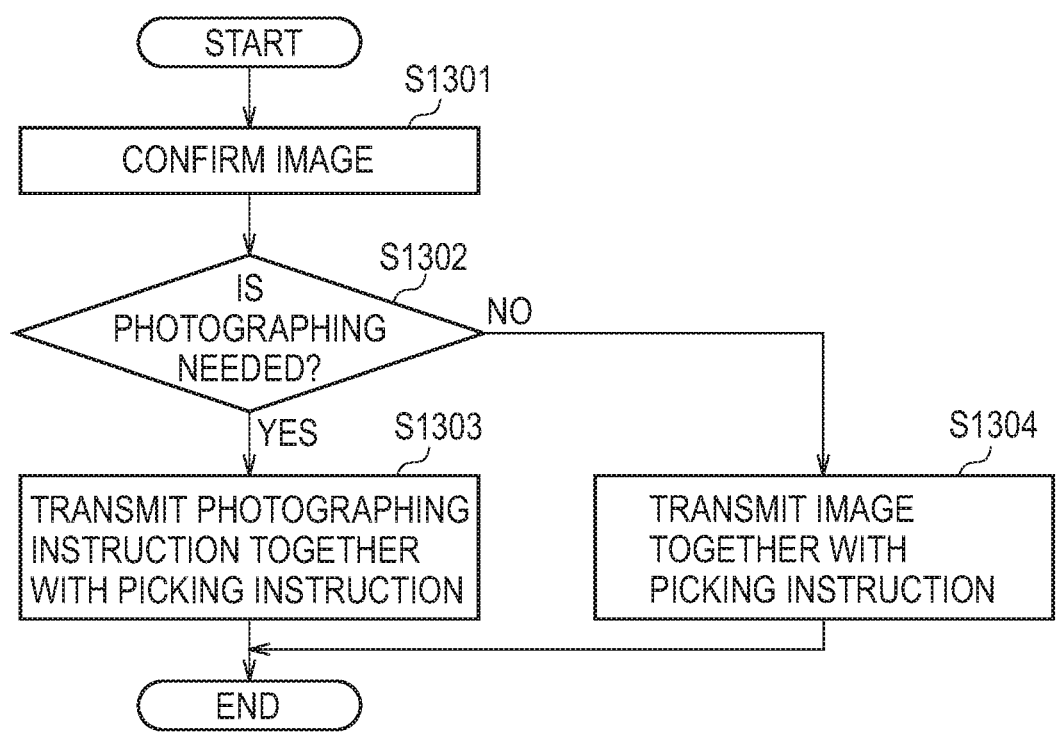
FIG. 13 is a flowchart illustrating an exemplary process of the server device.

FIG. 13 is a flowchart illustrating an exemplary process of the server device 130 when the server device 130 executes the process to determine whether to photograph the packing style image of the picking target article or not.

In S1301, the CPU 30 confirms whether the packing style image of the article having the type identical to that of the picking target article has been registered in the memory 31 or not with the memory 31.

In S1302, the CPU 30 determines whether to need to photograph the packing style image of the picking target article or not based on a result of the confirmation in S1301. For example, when the result of the confirmation in S1301 is a result indicating that the packing style image of the article having the type identical to that of the picking target article is confirmed not to be stored in the memory 31, the CPU 30 determines to need to photograph the packing style image of the picking target article to proceed to the process in S1303. For example, when the result of the confirmation in S1301 is a result indicating that the packing style image of the article having the type identical to that of the picking target article is confirmed to be stored in the memory 31, the CPU 30 determines not to need to photograph the packing style image of the picking target article to proceed to the process in S1304.

In S1303, the CPU 30 transmits the information indicating that the photographing of the packing style of the picking target article is needed to the smart glasses 100 together with the picking instruction of the picking target article. The CPU 30, similarly to CS601, puts the position information of the shelf in which the table as the picking target has been stored, the article code of the table as the picking target, the information on the name, the information on the number of the tables to be picked, and the like in the picking instruction to be transmitted. The CPU 10, after receiving the information indicating that the photographing of the packing style of the picking target article is needed, together with the picking instruction of the picking target article, displays the photographing instruction screen on the display 14 to instruct the worker to perform the photographing with a process similar to that in CS606.

In S1304, when the packing style image of the picking target article has been registered in the memory 31, the CPU 30 transmits the packing style image of the picking target article registered in the memory 31 to the smart glasses 100, together with the picking instruction of the picking target article. The CPU 30, similarly to CS601, puts the position information of the shelf in which the table as the picking target has been stored, the article code of the table as the picking target, the information on the name, the information on the number of the tables to be picked, and the like in the picking instruction to be transmitted. The CPU 10, after receiving the packing style image of the picking target article together with the picking instruction of the picking target article, presents the packing style image of the picking target article to the worker with a process similar to that in CS1006.

As described above, when the server device 130 determines whether to need to photograph the packing style of the picking target article or not, the communication between the smart glasses 100 and the server device 130 such as in CS602 and CS604 can be reduced compared with the case in FIG. 6. This enables the information processing system to save the communication band between the smart glasses 100 and the server device 130.

When the article state is changed from the state packed in the case to the state taken out of the case, the CPU 30 cannot know the state of this article. Therefore, the CPU 30, for example, executes a process as follows when executing the process to determine whether to photograph the packing style image of the article or not based on the article state. That is, the CPU 30 requests the information indicating the article state from the smart glasses 100. The CPU 10 obtains the information indicating the article state to transmit the obtained information to the server device 130. Then, the CPU 30 executes the process to determine whether to photograph the packing style image of the article or not based on the article state, based on the information indicating the article state obtained from the smart glasses 100. The process where the server device 130 determines whether to photograph the packing style image of the article or not based on the article state is a process similar to the process where the smart glasses 100 determine whether to photograph the packing style image of the article or not based on the article state.

In this embodiment, the CPU 10 displays the photographing instruction screen that instructs the photographing of the packing style image of the article on the display 14 to instruct the user who is wearing the smart glasses 100 to photograph the packing style image of the article. However, the CPU 10 may, for example, control the camera 110 to perform the photographing at a set timing such as a timing specified from the server device 130. In this case, the CPU 10 displays, for example, a screen indicating how many seconds later, which range is to be photographed with the camera 110 on the display 14 to move the article into the photographing range of the camera 110 with respect to the user. This enables the information processing system to reduce an operation work load of the camera 110 on the user. That is, in this embodiment, displaying the screen indicating how many seconds later, which range is to be photographed with the camera 110 on the display 14 itself will be the instruction for photographing the packing style image to the worker.

In this embodiment, the CPU 10 puts the packing style image of the picking target article in the presentation screen as in FIG. 11 to display it on the display 14. However, the CPU 10 may put the packing style image of the picking target article in the picking instruction screen as in FIG. 7 to display it on the display 14, thus presenting it to the user.

In this embodiment, the information processing system stores the packing style image of the article in the memory 31, but, for example, may store the packing style image in an external storage device such as an external hard disk or a storage server.

In this embodiment, the picking work is described as an example. However, the feature of the information processing system is a point that the necessity and the rationality of the photographing of the article image is determined in the information processing system. The photographing of the image of the article may be performed in another warehouse work such as in the warehousing work.

In this embodiment, the information processing system instructs the worker to photograph the article, while the worker photographs the image of the article. However, the information processing System may photograph the image of the article without making the worker aware of it.

For example, the information processing system photographs the image of the article at a scan timing of the barcode of the article. That is, in the scanning of the barcode of the article required to be photographed, the information processing system first makes the camera 110 be in a zoom state, and when determining to need the photographing, after recognizing the barcode, zooms out to photograph the image of the article at a timing when the whole article can be photographed. This enables the information processing system to capture the article single body without the worker putting effort.

The information processing system may determine whether to photograph the packing style image of the article or not as follows, without making the determination simply based on whether the packing style image has already existed for the article having the identical article code or not. The information processing system may determine whether the packing style image has already existed for the article having the identical article code photographed in an identical location or not, thus determining the article as the photographed target. The information processing system determines not to photograph the picking target article when determining that the packing style image has been existed, and determines to photograph the picking target article when determining that the packing style image does not exist. This case is especially effective, for example, when the image of the state where the article has been placed in the shelf has been photographed, for example, as the packing style image of the article and the image indicating how the article has been placed in the shelf is necessary.

When the packing style image of the article having the type identical to that of the picking target article photographed in the identical location has been registered in the memory 31, the information processing system will present this image to the worker. However, when the packing style image of the article having the type identical to that of the picking target article photographed in the identical location has not been registered in the memory the information processing system may execute a process as follows. That is, when the packing style image of the article having the type identical to that of the picking target article photographed in a different location has been registered in the memory 31, the information processing system may present this image to the worker. When the packing style image of the article having the type identical to that of the picking target article photographed in the different location also has not been registered in the memory 31, the information processing system may instruct the worker to photograph the packing style image of the picking target article.

The information processing system may give the photographing instruction that instructs the photographing of, for example, the image of the article single body (for example, the state where the worker is picking up the article) as the photographing instruction of the article or may give the photographing instruction that instructs the photographing of, for example, the image of the article in the state placed in the shelf. The information processing system may give the photographing instruction that instructs the photographing of both images and it is not limited. Especially, for the image in the state where the article has been placed in the shelf, a plurality of articles are captured in the image. Thus, the information processing system, for example, may display an arrow on the display 14 in the photographing to display a message such as "please photograph the article with adjusting the article below this arrow," thus registering an image obtained by overlapping this arrow with the photographed image.

For the packing style image, the subsequent worker who has referred it may respond that it is an inappropriate image. For the packing style image having inappropriate evaluation responses with a given number or more, this packing style image may be deleted. The CPU 10 transmits the information indicating that the image of the picking target article is inappropriate to the server device 130, for example, based on the operation via the operating unit of the smart glasses by the user. Then, the CPU 30 receives the information indicating that this image is inappropriate transmitted from the smart glasses 100 to delete this image from the memory 31 when the number of reception of the information indicating that this image is inappropriate becomes a given number or more. With such a process, the information processing system can efficiently manage the packing style image since the information processing system can hold only the effective packing style image.

Other Embodiment

As described above, the preferred embodiment of the present invention has been described in detail. However, the present invention is not limited to such a specific embodiment. For example, a part of or all of the function composition of the above-described information processing system may be implemented in the smart glasses 100 or the server device 130 as hardware.

The preferred embodiment of the present invention has been described above in detail. However, the present invention is not limited to such a specific embodiment. Various changes and modifications can be made without departing from the scope of the present invention as defined in the appended claims.

With the above-described process in each embodiment, when it is necessary to photograph the packing style image of the article for the subsequent worker in the warehouse work of the prior worker, the prior worker can be instructed to photograph the packing style image of the article.

The invention claimed is:

1. A system comprising
a first information processing device configured to:
confirm whether an image of an actual stored state shape of an article as a work target in a first warehouse work has been registered in a storage unit of a second information processing device, when the actual stored state shape of the article is different from another state shape of the article; and
when the image of the actual stored state shape of the article has not been registered in the storage unit:
make a determination to photograph, via a camera, the image of the actual stored state shape of the article as the work target in the first warehouse work; and
register the image of the actual stored state shape of the article in the storage unit for use as an image in a second warehouse work performed after the first warehouse work.

2. The system according to claim 1, further comprising a third information processing device configured such that when the first information processing device determines to photograph the image of the actual stored state shape of the article, the third information processing device instructs a worker in the first warehouse work to photograph the image of the actual stored state shape of the article.

3. The system according to claim 2, further comprising a camera configured such that when the first information processing device determines to photograph the image of the actual stored state shape of the article, when the image of the actual stored state shape of the article is photographable, the camera photographs the image of the actual stored state shape of the article.

4. The system according to claim 2, further comprising a display configured to present the image of the actual stored state shape of the article photographed in response to the instruction by the third information processing device to a worker, the worker being instructed to perform the second warehouse work for an article having a type identical to a type of the article after the first warehouse work.

5. The system according to claim 2, wherein the image of the actual stored state shape of the article is photographed in response to the instruction to photograph the image of the actual stored state shape of the article by the third information processing device.

6. The system according to claim 2, wherein the third information processing device is configured such that when the first information processing device determines to photograph the image of the actual stored state shape of the article, the third information processing device instructs the worker in the first warehouse work to photograph the image of the actual stored state shape of the article by displaying information instructing the photographing of the image of the actual stored state shape of the article on a display unit.

7. The system according to claim 2, further comprising a fourth information processing device configured to accept an evaluation for the image of the actual stored state shape from a worker, wherein
the third information processing device is configured such that when the evaluation accepted by the fourth information processing device is an evaluation indicating inappropriateness as the image of the actual stored state shape of the article, the third information processing device instructs the worker in the first warehouse work to photograph the image of the actual stored state shape of the article by displaying information instructing the photographing of the image of the actual stored state shape of the article on a display unit.

8. The system of claim 7, wherein the first information processing device, the second information processing device, the third information processing device and the fourth information processing device are the same device.

9. The system of claim 2, wherein the first information processing device, the second information processing device and the third information processing device are the same device.

10. The system according to claim 1, wherein
the first information processing device is configured to determine whether to photograph the image of the actual stored state shape of the article based on whether an image of an actual stored state shape of another article having a type identical to a type of the article has been registered.

11. The system according to claim 1, wherein
the first information processing device is configured to determine whether to photograph the image of the actual stored state shape of the article based on an order content of another article having a type identical to a type of the article.

12. The system according to claim 11, wherein
the first information processing device is configured to determine whether to photograph the image of the actual stored state shape of the article based on whether an order of another article having a type identical to a type of the article exists, as the order content.

13. The system according to claim 1, wherein
the first information processing device is configured to determine whether to photograph the image of the actual stored state shape of the article based on a state of the article.

14. The system according to claim 13, wherein
the first information processing device is configured to determine whether to photograph the image of the actual stored state shape of the article based on whether the article is in a state contained in a case as the state of the article.

15. The system according to claim 1, wherein
the first information processing device is configured to determine whether to photograph the image of the actual stored state shape of the article based on whether the image of the actual stored state shape of the article has been registered and an order content for the article.

16. The system of claim 1, wherein the first information processing device and the second information processing device are the same device.

17. An information processing device comprising
a first server configured to:
confirm whether an image of an actual stored state shape of an article as a work target in a first warehouse work has been registered in a storage unit of a second server, when the actual stored state shape of the article is different from another state shape of the article; and make a determination, when the image of the actual stored state shape of the article has not been registered in the storage unit:
- to photograph a image of the actual stored state shape of the article as the work target in the first warehouse work; and
- register the image of the actual stored state shape of the article in the storage unit for use as an image in a second warehouse work performed after the first warehouse work.

18. The system of claim 17, wherein the first server and the second server are the same server.

19. An information processing method executed by a system, the information processing method comprising:

confirming whether an image of an actual stored state shape of an article as a work target in a first warehouse work has been registered in a storage unit of an information processing device, when the actual stored state shape of the article is different from another state shape of the article; and determining, when the image of the actual stored state shape of the article has not been registered in the storage unit:
- to photograph a image of the actual stored state shape of the article as the work target in the first warehouse work; and
- register the image of the actual stored state shape of the article in the storage unit for use as an image in a second warehouse work performed after the first warehouse work.

20. An information processing method executed by an information processing device, the information processing method comprising:

confirming whether an image of an actual stored state shape of an article as a work target in a first warehouse work has been registered in a storage unit of a server, when the actual stored state shape of the article is different from another state shape of the article; and determining, when the image of the actual stored state shape of the article has not been registered in the storage unit:
- to photograph the image of the actual stored state shape of the article as the work target in the first warehouse work; and
- register the image of the actual stored state shape of the article in the storage unit for use as an image in a second warehouse work performed after the first warehouse work.

21. A computer readable recording medium that records a program to cause a computer to execute instructions to:

confirm whether an image of an actual stored state shape of an article as a work target in a first warehouse work has been registered in a storage unit of a server, when the actual stored state shape of the article is different from another state shape of the article; and make a determination when the image of the actual stored state shape of the article has not been registered in the storage unit;

to photograph the image of the actual stored state shape of the article as the work target in the first warehouse work; and register the image of the actual stored state shape of the article in the storage unit for use as an image in a second warehouse work performed after the first warehouse work.

* * * * *